United States Patent [19]

Suzuki

[11] Patent Number: 5,131,508
[45] Date of Patent: Jul. 21, 1992

[54] APPARATUS FOR MONITORING ELEVATOR CAGES FOR CRIME PREVENTION

[75] Inventor: Shigehiko Suzuki, Aichi, Japan

[73] Assignee: Mitsubishi Denki Kabushiki Kaisha, Tokyo, Japan

[21] Appl. No.: 617,016

[22] Filed: Nov. 21, 1990

[30] Foreign Application Priority Data

Nov. 28, 1989 [JP] Japan .................. 1-306714

[51] Int. Cl.⁵ .............................. G01P 13/00
[52] U.S. Cl. ........................ 187/132; 187/140
[58] Field of Search .............. 187/131, 133; 382/8; 328/54

[56] References Cited

U.S. PATENT DOCUMENTS

| | | | |
|---|---|---|---|
| 3,973,648 | 8/1976 | Hummert et al. | 187/133 |
| 4,057,845 | 11/1977 | Ejiri et al. | 382/8 |
| 4,555,724 | 11/1985 | Enriquez | 187/131 |
| 4,930,604 | 6/1990 | Schienda et al. | 187/133 |
| 4,941,192 | 7/1990 | Mishima et al. | 328/54 |

Primary Examiner—A. D. Pellinen
Assistant Examiner—Lawrence E. Colbert
Attorney, Agent, or Firm—Leydig, Voit & Mayer

[57] ABSTRACT

Apparatus for monitoring the cage of an elevator for crime prevention including a connection establishing two-way voice communication between a telephone/television within the elevator cage and a similar device at a remote monitoring point. Communication is automatically established in response to a signal, such as generated by elevator call buttons, utilized in operation of the cage.

10 Claims, 2 Drawing Sheets

APPARATUS FOR MONITORING ELEVATOR CAGES FOR CRIME PREVENTION

This invention relates to an apparatus for monitoring elevator cages for crime prevention.

BACKGROUND OF THE INVENTION

Heretofore, apparatus for monitoring elevator cages for crime prevention has been proposed which involves actuation of the apparatus by an elevator passenger after such passenger enters an elevator cage. Such apparatus is relatively complex and requires operating procedures to be followed by the passenger.

SUMMARY OF THE INVENTION

The principle object of this invention is to provide apparatus for monitoring elevator cages which utilizes monitoring equipment in elevator cages and which is set into operation automatically by a signal generated in the normal operation of a cage.

Another object is to provide for automatic monitoring of elevator cages from monitoring stations at different locations, to ensure that if a first monitoring station is not being attended at a particular time during the day or night, that a watch center at an alternative monitoring station which is attended will be automatically connected in the system to monitor the cages when a passenger enters a cage.

Another object is to provide an automatically actuated system which reveals to the passenger that his safety is being monitored, to give the passenger peace of mind.

Further objects of the invention will become apparent from the following description taken in conjunction with the accompanying drawings.

Figure 2:
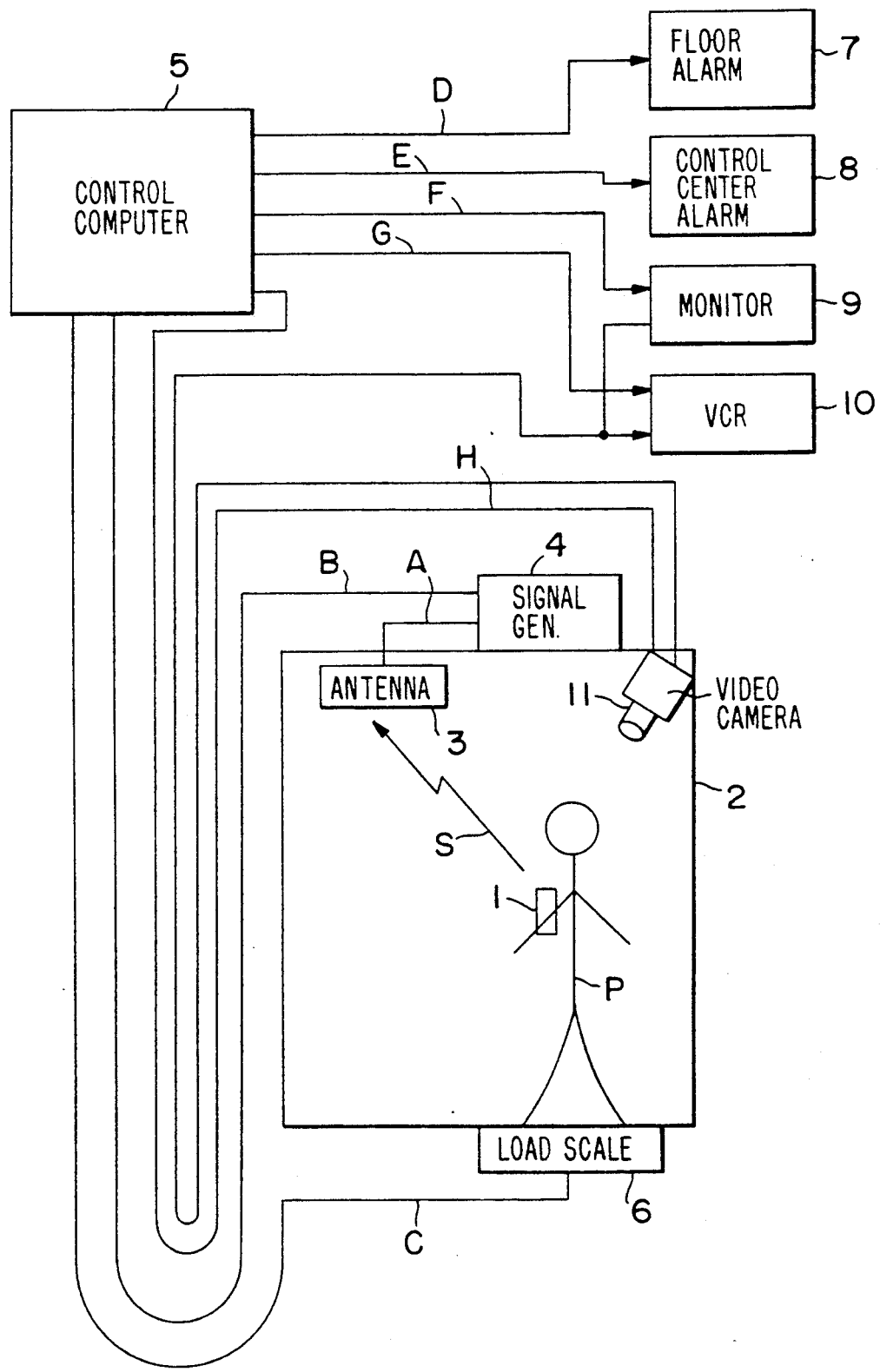
FIG. 2 is a block diagram illustrating a prior art apparatus.

Turning first to the prior system illustrated in FIG. 2, this apparatus for crime prevention in an elevator cage is described in Japanese Provisional Publication No. 181687/89. In this apparatus, a portable oscillator 1 is carried by a passenger P who enters an elevator cage 2. The elevator cage 2 has an antenna 3 which is shown mounted near the ceiling of the cage and within the range of the oscillator 1.

When the passenger P with a portable oscillator 1 enters the cage 2, a signal S which is emitted from the portable oscillator 1 is received by the antenna 3 and is decoded and transmitted to the control computer. Provision is made in the control system for identifying a passenger requested to use the elevator, transmitting alarm signals when the passenger is not registered to a floor alarm and an alarm at the elevator control center, and activating a television monitor including a video camera in the elevator cage and a monitor which may have a VCR at the control center.

However, in the case of the above-described prior art, problems are raised in that the passenger P must be provided with a specially designed portable oscillator which is used to activate the apparatus for crime prevention in an elevator cage, and as the passenger B cannot converse with a monitoring guard or other attendant, the passenger B may become apprehensive that the apparatus is broken.

DESCRIPTION OF BEST MODE

Figure 1:
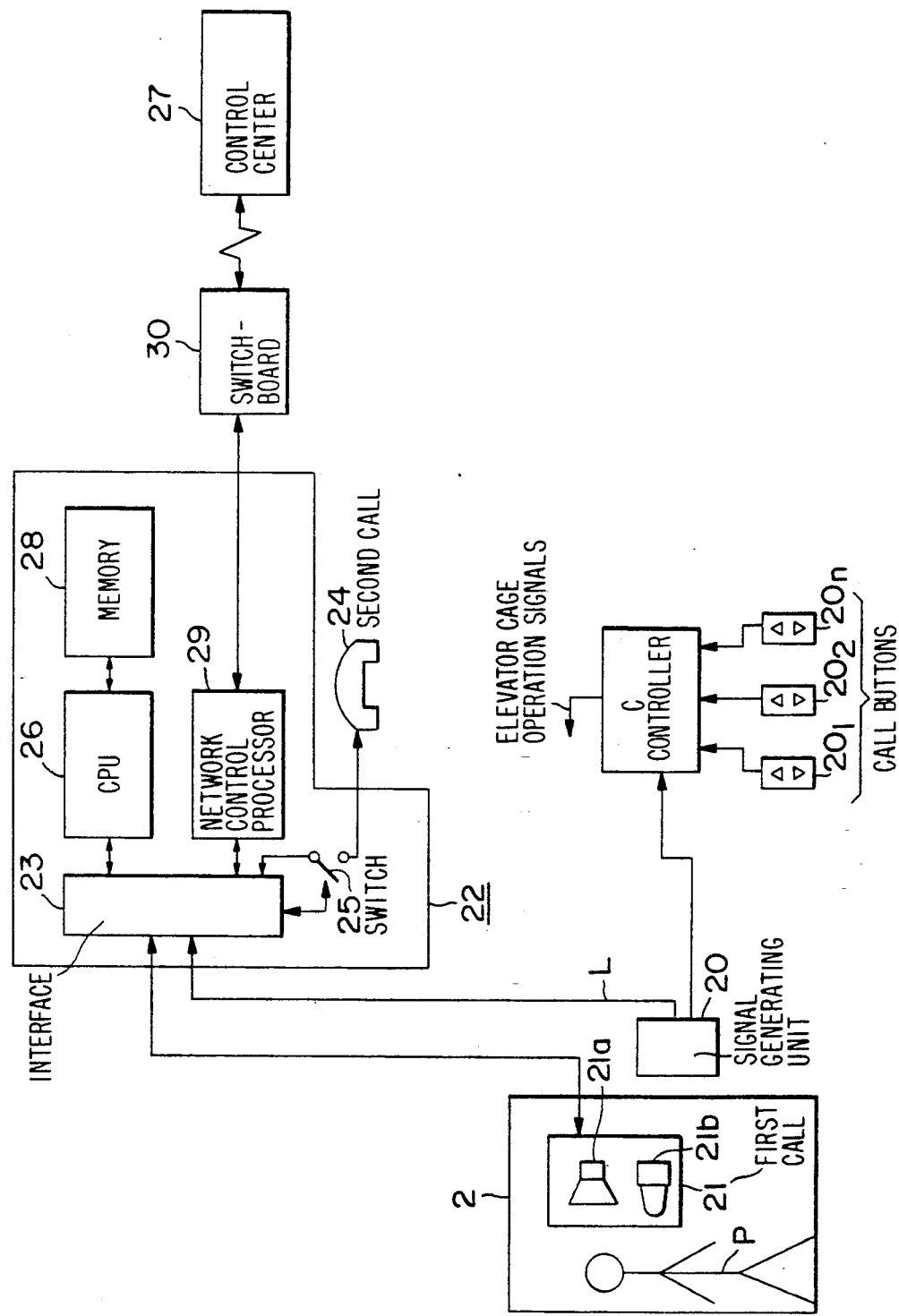
FIG. 1 is block diagram of a monitoring apparatus for an elevator cage embodying the present invention.

Referring now to FIG. 1, to serve the function of a driving switch for initiating operation of the monitoring apparatus of this invention, means is provided for generating a signal which is used in the normal operation of the elevator, preferably the call buttons 20 which are located in a elevator hall at various floors of a building and used for calling elevator cages to the floors. In addition to the call buttons 20, the apparatus of this embodiment of the invention employs a first call means 21 which is in the cage 2 and includes a speaker 21a and a microphone 21b, and a second call means outside the elevator cage which is automatically connected to the first call means 21 before a passenger enters the cage 2. To provide the automatic connection, the first call means 21 and the call buttons 20 are connected to a connection means 22 which is separate from the cage 2, illustratively at a nearby monitoring station in the building in which the elevator is installed, and includes an interface means 23 which is connected to receive signals from the call buttons 20 and the first call means 21.

In keeping with the invention, when a call button 20 is activated to call a cage by a person at a particular floor in a building, it also activates the monitoring apparatus of this invention to connect the first call means 21 in the cage through the interface means 23 to a second call means 24. This second call means 24 is located at the nearby monitoring station to be operated by an attendant such as a building janitor or a building guard.

Further, in keeping with the invention, to allow monitoring from a remote watch center when the first monitoring station is unattended, the connection means 22 also includes a switch 25 which is actuated into an open position, when the attendant is not present, to disconnect the second call means 24 from the system. In keeping with the invention, the state of the switch 25 is sensed by a CPU 26 which is included in the connection means and when the CPU 26 detects an open switch 25, it operates under a stored program to cause a connection to be made to an alternative second call means 27 through, preferably, the phone system of the building and local exchange where the building is located. For this purpose, also included in the connection means 22 is a memory means 28 which is connected to the CPU 26 and may be provided to store control data as well as programs to operate the CPU 26, and a network control processor (NCP) 29 which is connected to the interface means 23. As illustrated, a telephone is preferably used as the second call means connected through the interface means 23 to the first call means 21 in the cage 2. Likewise, a telephone is preferably used as the alternative second call means 27, and a switchboard 30 is provided which is connected to the network control processor 29 to make a connection through the telephone of an alternative second call means 27 located at the remote watch center which may be operated by a supervising company or organization.

Accordingly, in the operation of the disclosed preferred embodiment of this invention, when the passenger P operates one of the call buttons 20 to call an elevator cage to the floor, a call signal L which activates the crime prevention apparatus of this invention is generated and input to the CPU 26 through the interface means 23 of the connection means 22.

After detecting a call signal L, the CPU 26 is operated pursuant to a stored program to sense the condition or state of the switch 25. If the attendant is present (if the condition of the switch 25 is closed), the CPU 26 operates to connect the first call means 21 in the cage with the telephone of the second call means 24 through the interface means 23. If the attendant is not present, i.e., if the condition of the switch 25 is open, the CPU 26 is operated to activate the NCP 29 which includes apparatus to dial automatically the telephone number of the remote watch center alternative second call means 27. When a connection is made through the telephone line to the telephone of the remote watch center, the CPU 26 operates to connect the first call means 21 of the cage with the telephone of the second call means 27 in the watch center through the interface means 23, NCP 29, switchboard 30 and the telephone line.

The first call means 21 is thus automatically connected with the alternative call means telephone when the passenger P operates the call button and the CPU 26 detects that an attendant is not present at the nearly monitoring station where the connection means 22 and second call means 24 is located.

After the cage arrives at the floor in response to the hall call, the passenger P enters the cage 2 of the elevator. After the passenger P enters the cage 2, the attendant in the nearby monitoring station or an operator of the telephone at the remote watch center utilizes the first calls means 21 in the cage to talk to the passenger P.

For example:
Attendant: "Sorry to have kept you waiting, you are being guarded by us, so please don't worry. Well, are you alone in the cage?"
Passenger: "..."
Attendant: "What floor will you go to?"
Passenger: "..."

As a result of speaking with a passenger and listening to sound in the cage through the microphone 21b of the first call means 21, the attendant or operator of the telephone is able to know the condition of the cage 2.

Therefore, this invention has the object to provide an apparatus and system which can prevent a crime before it occurs. Furthermore, the attendant can learn of a suspicious passenger or of a crime if it does happen, so that the attendant can rush to the scene or call the police to arrest the offender.

After confirming that the cage has arrived at the destination floor without any crime occurring, the attendant or the operator of the watch center hangs up the second call means or alternative second call means 24, 27 and communication is disconnected.

While telephones are shown for the second and alternative second call means in the illustrated embodiment, which send only voice signals, it may be desired to use a television-telephone which is able to send a picture together with a voice communication, or instead of a voice communication. For crime prevention, television monitoring may have an advantage because the attendant or operator is able to watch the condition in the cage 2.

It may also be desired to include a video and/or voice recorder in this system to record dialogue and/or video picture for later use in apprehending or prosecuting a criminal offender.

Other features of the monitoring system of this invention are as follows:

When the cage 2 arrives at the floor in response to actuation of one of the call buttons of the crime prevention apparatus, or when the door of the cage 2 is opened to answer a call of a passenger, the attendant starts to speak to the passenger P. The attendant can reconfirm that the passenger P desires to travel to a particular destination floor after the attendant confirms a registered call. When the cage arrive at the particular destination floor which is desired by the passenger P, the attendant can confirm the safe arrival of the passenger P.

When the passenger departs from the cage 2, the system has achieved the objective of crime prevention.

Further in keeping with the invention, the actuation of the apparatus which results in a connection being made between a first and second call means of the monitoring apparatus of this invention may be in response to any signal generated at the elevator and utilized in normal operation of a cage. For example, instead of the apparatus being actuated in response to a signal generated by operation of a call button as above described, the apparatus may be activated in response to a signal generated by a scale which is mounted in a cage to detect the passenger load in the elevator or a photo-sensor which is located in a doorway of the elevator to detect the entrance or departure of passenger, and which generates a signal that is transmitted to a CPU of a cage controller located in a machine room. The signal generating means thus serves both for initiating the operation of the crime prevention apparatus of this invention and a function associated with the operation of a cage, such as starting or stopping elevator operation, controlling door operation, regulating speed or torque applied by the elevator motor to raise or lower the cage. Accordingly, the signal generating means such as a load scale, a photo-sensor in the cage doorway, or an elevator hall call button, performs its normal function of generating a signal which is utilized in the operation of a cage and also provides a means for generating a signal utilized in the monitoring apparatus of this invention to cause the communication connection to be established between the first and second call means.

I claim:

1. An apparatus for monitoring the cage of an elevator serving a plurality of halls for crime prevention comprising:
   (a) first call means within an elevator cage;
   (b) second call means outside the elevator cage;
   (c) signal generating means provided at the elevator for generating a signal utilized in operation of the cage and transmitted to a controller which controls the cage operation; and
   (d) connection means providing a two-way voice communication connection between said first and said second call means in response to actuation of said signal generating means to generate a signal, whereby when said signal generating means is actuated and a passenger enters the cage, voice communication automatically is established between said second call means through the communication connection and said first call means for monitoring the status of the passenger.

2. A monitoring apparatus according to claim 1 wherein said signal generating means includes elevator call buttons provided in their respective halls served by the elevator and connected to a controller which controls registration of hall calls and operates the cage in response to actuation of a call button by a passenger to initiate a call.

3. A monitoring apparatus according to claim 1 wherein said signal generating means includes a photo-sensor mounted in a door opening of the cage which detects a passenger entering or departing a cage and produces a signal transmitted to a controller which controls operation of a cage.

4. A monitoring apparatus according to claim 1 wherein said signal generating means includes a scale mounted to the cage which detects passenger load and produces a signal transmitted to a controller which controls operation of the cage.

5. A monitoring apparatus according to claim 1 wherein said first and second call means both comprise a telephone.

6. A monitoring apparatus according to claim 1 wherein said first and second call means both comprise a television-telephone.

7. A monitoring system according to claim 1 further including an alternative second call means and wherein said connection means includes a network control processor for dialing through a telephone system a telephone at a watch center located at a remote location from the elevator to establish a two-way voice connection to said first call means to monitor status of a passenger in the cage.

8. A monitoring apparatus according to claim 7 wherein said connection means includes a switch means which when actuated connects a second call means at a nearby location to the elevator to the first call means for monitoring the status of a passenger in the cage from the nearby location.

9. A monitoring apparatus according to claim 8 wherein said connection means includes a processing means for detecting the state of said switch means and for operating said network control processor when said switch means is in a state representing that the second call means is disconnected, to automatically dial the alternative second call means at a remote watch center and establish a connection to the first call means for monitoring the status of a passenger in the cage from the remote watch center.

10. An apparatus for monitoring a cage of an elevator serving a plurality of halls for crime prevention comprising:
 (a) first call means within an elevator cage;
 (b) second call means outside the elevator cage;
 (c) elevator call buttons provided in the respective halls served by the elevator and connected to a controller which controls registration of hall calls and operates the cage;
 (d) connection means providing a voice communication connection between said first and said second call means in response to actuation of an elevator call button by a passenger to initiate a hall call,
 whereby when a passenger enters a cage which has arrived at a floor in response to a registered hall call initiated by the passenger, voice communication is established between the second call means through the communication connection and the first call means for monitoring the status of the passenger in the cage.

* * * * *